United States Patent
Luong et al.

(10) Patent No.: US 10,630,357 B2
(45) Date of Patent: Apr. 21, 2020

(54) WIRELESS PERSONAL AREA NETWORK TRANSMIT BEAMFORMING

(71) Applicant: QUALCOMM Incorporated, San Diego, CA (US)

(72) Inventors: Le Luong, San Diego, CA (US); Anssi Haverinen, San Diego, CA (US); Yoshiro Fukuoka, Solana Beach, CA (US); Paul Denboer, Escondido, CA (US); Huibert Denboer, Escondido, CA (US); Joel Linsky, San Diego, CA (US); Thomas Cargill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 15/640,410

(22) Filed: Jun. 30, 2017

(65) Prior Publication Data
US 2019/0007115 A1    Jan. 3, 2019

(51) Int. Cl.
*H04B 7/06* (2006.01)
*H04B 1/713* (2011.01)
*H04B 17/11* (2015.01)

(52) U.S. Cl.
CPC .......... *H04B 7/0617* (2013.01); *H04B 1/713* (2013.01); *H04B 7/0626* (2013.01);
(Continued)

(58) Field of Classification Search
CPC .................................................... H04B 7/0617
(Continued)

(56) References Cited

U.S. PATENT DOCUMENTS

| 8,600,436 B2 | 12/2013 | Haartsen |
| 9,942,814 B1* | 4/2018 | Pawar .................. H04W 36/08 |

(Continued)

FOREIGN PATENT DOCUMENTS

| EP | 1107475 A2 | 6/2001 |
| WO | 2016048231 A1 | 3/2016 |

OTHER PUBLICATIONS

International Search Report and Written Opinion—PCT/US2018/034560—ISA/EPO—dated Nov. 6, 2018.
(Continued)

*Primary Examiner* — Peter G Solinsky
(74) *Attorney, Agent, or Firm* — Muncy, Geissler, Olds & Lowe

(57) ABSTRACT

According to various aspects, techniques to enable implicit and/or explicit transmit (Tx) beamforming in a wireless personal area network are provided. In particular, the implicit transmit beamforming may be enabled during certain events, frames, and/or other conditions when a channel between a beamformer and a beamformee is reciprocal (i.e., packets are received and transmitted on the same frequency). In such cases, the beamformer may estimate channel state information (CSI) based on a packet received from the beamformee and use the estimated CSI to steer a beam in a direction towards the beamformee. In use cases that implement explicit transmit beamforming, the beamformee may estimate the CSI based on a packet received from the beamformer and provide the estimated CSI to the beamformer, which may then use the estimated CSI received from the beamformee to steer a beam in a direction towards the beamformee.

44 Claims, 8 Drawing Sheets

(52) U.S. Cl.
CPC ......... *H04B 7/0632* (2013.01); *H04B 7/0639* (2013.01); *H04B 7/0658* (2013.01); *H04B 7/0695* (2013.01); *H04B 17/11* (2015.01)

(58) Field of Classification Search
USPC .......................................................... 370/332
See application file for complete search history.

(56) References Cited

U.S. PATENT DOCUMENTS

| | | | | |
|---|---|---|---|---|
| 2007/0286303 | A1* | 12/2007 | Yamaura | H04B 7/0421 375/267 |
| 2008/0232308 | A1* | 9/2008 | Dehner | H04W 52/0225 370/329 |
| 2009/0232010 | A1 | 9/2009 | Li et al. | |
| 2010/0054223 | A1* | 3/2010 | Zhang | H04L 25/03343 370/338 |
| 2010/0248635 | A1 | 9/2010 | Zhang et al. | |
| 2011/0261708 | A1* | 10/2011 | Grandhi | H04W 4/06 370/252 |
| 2011/0310827 | A1 | 12/2011 | Srinivasa et al. | |
| 2013/0109405 | A1* | 5/2013 | Siomina | G01S 5/0252 455/456.1 |
| 2013/0170452 | A1* | 7/2013 | Kwon | H04W 72/04 370/329 |
| 2013/0215947 | A1* | 8/2013 | Yao | H04B 7/0617 375/224 |
| 2013/0286959 | A1* | 10/2013 | Lou | H04W 72/04 370/329 |
| 2014/0070996 | A1* | 3/2014 | Kneckt | H04W 64/006 342/386 |
| 2014/0093005 | A1 | 4/2014 | Xia et al. | |
| 2016/0309305 | A1 | 10/2016 | Wilhelmsson et al. | |
| 2017/0033904 | A1 | 2/2017 | Stirling-Gallacher et al. | |
| 2017/0041974 | A1* | 2/2017 | Liao | H04W 76/14 |
| 2017/0180019 | A1* | 6/2017 | Suh | H04B 7/0452 |
| 2017/0311276 | A1* | 10/2017 | Tsai | H04B 7/0617 |
| 2017/0331587 | A1* | 11/2017 | Kim | H04L 1/1614 |
| 2017/0331670 | A1* | 11/2017 | Parkvall | H04W 52/0274 |
| 2019/0229776 | A1* | 7/2019 | Cao | H04B 7/0408 |

OTHER PUBLICATIONS

Partial International Search Report—PCT/US2018/034560—ISA/EPO—dated Aug. 20, 2018.

* cited by examiner

WIRELESS PERSONAL AREA NETWORK TRANSMIT BEAMFORMING

TECHNICAL FIELD

The various aspects and embodiments described herein generally relate to wireless communications, and in particular, to signaling that may enable transmit (Tx) beamforming in a wireless personal area network (WPAN).

BACKGROUND

In a multi-antenna communication system, multiple ($N_T$) transmit antennas and one or more ($N_R$) receive antennas are typically used for data transmission. The $N_T$ transmit antennas may be used to increase system throughput by transmitting different data from the antennas or to improve reliability by transmitting data redundantly. In the multi-antenna communication system, a propagation path exists between each pair of transmit and receive antennas. $N_T \cdot N_R$ different propagation paths are formed between the $N_T$ transmit antennas and the $N_R$ receive antennas. These propagation paths may experience different channel conditions (e.g., different fading, multipath, and interference effects) and may achieve different signal-to-noise-and-interference ratios (SNRs). The channel responses of the $N_T \cdot N_R$ propagation paths may thus vary from path to path, and may further vary over time for a time-variant wireless channel and across frequency for a dispersive wireless channel. The variant nature of the propagation paths makes it challenging to transmit data in an efficient and reliable manner.

Accordingly, one way to improve reliability for data transmission is to employ transmit diversity with a beamformer, which can potentially improve a link budget by more than three decibels (3 dB). For example, transmit diversity generally refers to redundant transmission of data across space, frequency, time, or a combination thereof. Among other things, transmit diversity may be used to maximize diversity for the data transmission across as many dimensions as possible to achieve robust performance and to simplify the processing for transmit diversity at both a transmitter and a receiver. Another complementary technique that can be used to improve performance of wireless transmissions is to employ beamforming to control the directionality of the transmitted signal. In transmitting systems or devices, beamforming may be employed between a signal source and antenna radiating elements to "shape" a radiated field in three dimensional space towards the receiving system(s) or device(s). In order to steer the beam toward the receiving system(s) or device(s), the transmitting system or device needs an estimate of the radio channel. However, existing techniques to obtain the channel estimate for a particular link between two devices assume that the channel is invariant and reciprocal, which often cannot be guaranteed in a wireless personal area network (WPAN) in which devices communicate using a frequency hopping scheme.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, techniques to enable implicit and/or explicit transmit (Tx) beamforming in a wireless personal area network (WPAN) are provided. In particular, the implicit transmit beamforming may be enabled during certain events, frames, and/or other conditions in which a channel between a beamformer device and a beamformee device can be assumed or guaranteed to be reciprocal (i.e., packets are received and transmitted on the same frequency). In such cases, the beamformer device may estimate channel state information (CSI) based on a packet received from the beamformee device and use the estimated CSI to steer a beam in a direction towards the beamformee device. In use cases that implement explicit transmit beamforming, the beamformee device may estimate the CSI based on a packet received from the beamformer device and provide the estimated CSI to the beamformer device, which may then use the estimated CSI received from the beamformee device to steer a beam in a direction towards the beamformee device.

According to various aspects, a method for beamforming wireless transmissions may comprise establishing, at a beamformer device, a wireless link with a beamformee device in a WPAN that implements a frequency hopping system, receiving, at the beamformer device, a first packet from the beamformee device, wherein the first packet may be received on a first frequency, estimating, at the beamformer device, channel state information associated with the wireless link based on the first packet received from the beamformee device, and beamforming, by the beamformer device, a second packet transmitted to the beamformee device on the first frequency such that the second packet is steered in a direction towards the beamformee device.

According to various aspects, a beamformer device may comprise a receiver configured to receive, from a beamformee device, a first packet transmitted on a first frequency over a WPAN that implements a frequency hopping system, one or more processors configured to estimate channel state information associated with a wireless link between the beamformer device and the beamformee device based on the first packet received from the beamformee device, and a transmitter comprising multiple transmit antennas configured to beamform a second packet transmitted to the beamformee device such that the second packet is steered in a direction towards the beamformee device, wherein the second packet is transmitted on the first frequency.

According to various aspects, a beamformer device may comprise means for receiving, from a beamformee device, a first packet transmitted on a first frequency over a WPAN that implements a frequency hopping system, means for estimating channel state information associated with a wireless link between the beamformer device and the beamformee device based on the first packet received from the beamformee device, and means for beamforming a second packet transmitted to the beamformee device such that the second packet is steered in a direction towards the beamformee device, wherein the second packet is transmitted on the first frequency.

According to various aspects, a computer-readable storage medium may have computer-executable instructions recorded thereon, wherein the computer-executable instructions may be configured to cause a beamformer device having one or more processors to receive, from a beamformee device, a first packet transmitted on a first frequency over a WPAN that implements a frequency hopping system, estimate channel state information associated with a wireless link between the beamformer device and the beamformee device based on the first packet received from the beamformee device, and beamform a second packet transmitted to the beamformee device such that the second packet is steered in a direction towards the beamformee device, wherein the second packet is transmitted on the first frequency.

According to various aspects, a method for beamforming wireless transmissions may comprise establishing, at a beamformer device, a wireless link with a beamformee device in a WPAN that implements a frequency hopping system, configuring, at the beamformer device, a first packet to request that the beamformee device return a response packet that enables the beamformer device to obtain an estimate of channel state information associated with the wireless link, transmitting, by the beamformer device, the first packet to the beamformee device, and beamforming, by the beamformer device, a second packet transmitted to the beamformee device in accordance with the frequency hopping system based on the response packet returned from the beamformee device, wherein the beamformer device is configured to beamform the second packet to steer the second packet in a direction towards the beamformee device.

According to various aspects, a beamformer device may comprise one or more processors configured to establish a wireless link with a beamformee device in a WPAN that implements a frequency hopping system and to configure a first packet to request that the beamformee device return a response packet to enable the beamformer device to obtain an estimate of channel state information associated with the wireless link, and a transmitter configured to transmit the first packet to the beamformee device and to transmit a second packet to the beamformee device in accordance with the frequency hopping system based on the response packet returned from the beamformee device, wherein the transmitter may comprise multiple transmit antennas configured to beamform at least the second packet such that the second packet is steered in a direction towards the beamformee device.

According to various aspects, a beamformer device may comprise means for establishing a wireless link with a beamformee device in a WPAN that implements a frequency hopping system, means for configuring a first packet to request that the beamformee device return a response packet to enable the beamformer device to obtain an estimate of channel state information associated with the wireless link, means for transmitting the first packet to the beamformee device, and means for transmitting a second packet to the beamformee device in accordance with the frequency hopping system based on the response packet returned from the beamformee device, wherein at least the second packet is beamformed such that the second packet is steered in a direction towards the beamformee device.

According to various aspects, a computer-readable storage medium may have computer-executable instructions recorded thereon, wherein the computer-executable instructions may be configured to cause a beamformer device to establish a wireless link with a beamformee device in a WPAN that implements a frequency hopping system, configure a first packet to request that the beamformee device return a response packet to enable the beamformer device to obtain an estimate of channel state information associated with the wireless link, transmit the first packet to the beamformee device, and transmit a second packet to the beamformee device in accordance with the frequency hopping system based on the response packet returned from the beamformee device, wherein at least the second packet is beamformed such that the second packet is steered in a direction towards the beamformee device.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
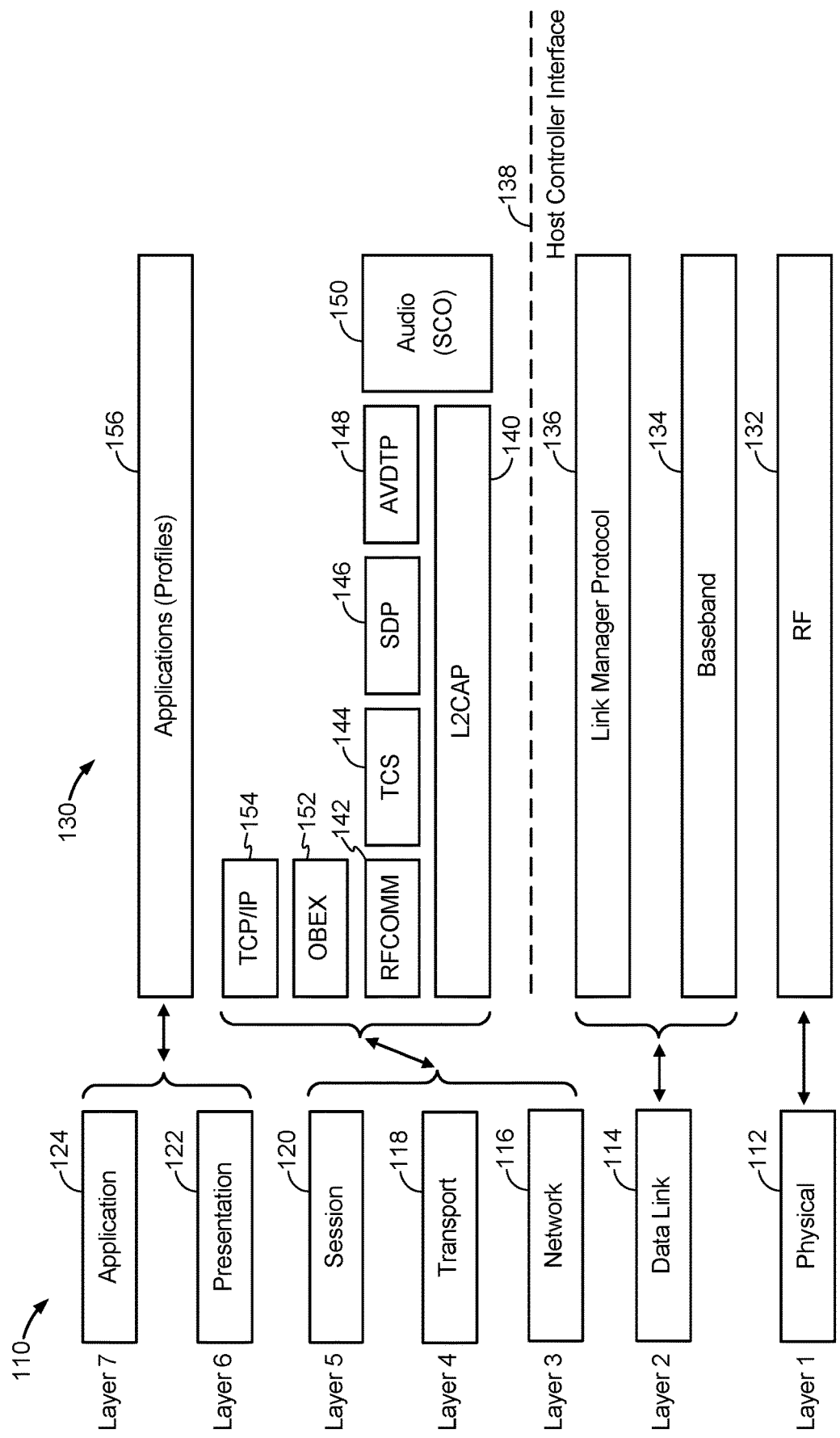
FIG. 1 illustrates a relationship between the Bluetooth protocol stack and the Open Systems Interconnect (OSI) seven-layer model, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "wireless personal area network" or "WPAN" may generally refer to a computer network used for data transmission among personal wireless devices such as cellular telephones, laptop computers, tablet computers, personal digital assistants (PDAs), and the like. In general, a WPAN can be used to enable communication among the personal wireless devices themselves (interpersonal communication) or to connect to a higher level network and the Internet (an uplink) where one "master" device acts as an internet router. A WPAN typically utilizes a short-range wireless network protocol such as Bluetooth® (e.g., Bluetooth® Low Energy (BLE), Bluetooth® Classic, Bluetooth® Long Range (BLR)), ZigBee®, Wireless USB, Z-Wave®, and the like. Accordingly, while much of the description provided herein pertains to implementations based on Bluetooth technology, those skilled in the art will appreciate that the various aspects and embodiments described herein may be suitably applied in other suitable WPANs and/or WPANs that utilize other suitable technologies.

According to various aspects, FIG. 1 illustrates a relationship between the Bluetooth protocol stack 130 and the seven layers in the Open Systems Interconnect (OSI) model 110, which was established to standardize information transmission between points over the Internet or other wired and/or wireless networks. In particular, the OSI model 110 generally separates communication processes between two points in a network into seven stacked layers, with each layer adding certain functions. Each device handles a message such that a downward flow through each layer occurs at a sending endpoint and an upward flow through the layers occurs at a receiving endpoint. The programming and/or hardware that provides the seven layers in the OSI model 110 is typically a combination of device operating systems, application software, TCP/IP and/or other transport and network protocols, and other software and hardware.

More particularly, referring to FIG. 1, the OSI model 110 includes a physical layer 112 (OSI Layer 1) used to convey a bit stream through a network at a physical level. The Institute of Electrical and Electronics Engineers (IEEE) sub-divides the physical layer 112 into the PLCP (Physical Layer Convergence Procedure) sub-layer and the PMD (Physical Medium Dependent) sub-layer. The data link layer 114 (OSI Layer 2) provides physical level synchronization, performs bit-stuffing, and furnishes transmission protocol knowledge and management, etc. The IEEE sub-divides the data link layer 114 into two further sub-layers, which comprise the Media Access Control (MAC) sub-layer to control data transfer to and from the physical layer and the Logical Link Control (LLC) sub-layer to interface with the network layer 116 (OSI Layer 3), interpret commands, and perform error recovery.

According to various aspects, still referring to FIG. 1, the network layer 116 (OSI Layer 3) handles data transfer across a network (e.g., routing and forwarding) in a manner independent from any media and specific network topology, the transport layer 118 (OSI Layer 4) manages end-to-end control and error-checking to multiplex data transfer across the network according to application-level reliability requirements, and the session layer 120 (OSI Layer 5) establishes, coordinates, and terminates conversations, exchanges, and dialogs between the applications to provide management and data flow control services.

According to various aspects, still referring to FIG. 1, the presentation layer 122 (OSI Layer 6) converts incoming and outgoing data from one presentation format to another, which may comprise adding service structure to the data units to provide data to the application layer 124 (OSI Layer 7) according to a common representation, while the application layer 124 is where communication partners are identified, quality of service (QoS) is identified, user authentication and privacy are considered, constraints on data syntax are identified, and any other functions relevant to managing communications between host applications are managed.

Turning now to the Bluetooth protocol stack 130, the radio frequency (RF) layer 132 generally corresponds to the physical layer 112 in the OSI model 110, the baseband layer 134 and the link manager protocol layer 136 generally correspond to the data link layer 114, and a Host Controller Interface (HCI) 138 separates the RF layer 132, the baseband layer 134, and the link manager protocol layer 136 from the upper layers. For example, the Physical Layer 112 in the OSI model 110 manages electrical interfaces to communications media, which includes modulation and channel coding, and therefore covers the Bluetooth radio(s) in the RF layer 132 (and possibly part of the baseband layer 134), while the data link layer 114 manages transmission, framing, and error control over a particular link, which overlaps tasks performed in the link manager protocol layer 136 and the control end of the baseband layer 134 (e.g., error checking and correction).

Above the HCI 138, the Logical Link Control and Adaptation Protocol (L2CAP) 140, RF communication (RF-COMM) channel 142, Telephony Control Specification (TCS) 144, Service Discovery Protocol (SDP) 146, Audio/Video Distribution Transport Protocol (AVDTP) 148, Synchronous Connection Oriented (SCO) Audio 150, object exchange (OBEX) 152, and TCP/IP 154 functions correspond to the network layer 116, transport layer 118, and session layer 120. The applications layer 156 comprises the Bluetooth profiles (e.g., the Handsfree Profile (HFP) for voice, the Advanced Audio Distribution Profile (A2DP) for high-quality audio streaming, the Video Distribution Profile (VDP) for video streaming, etc.) and corresponds to the presentation layer 122 and the application layer 124 in the OSI model 110. Accordingly, a Bluetooth profile may generally be considered synonymous with an "application" in the OSI model 110. In relation to the Bluetooth HFP, the RFCOMM channel 142 comprises a communication channel named "service level connection" ("SLC") (not shown) that emulates a serial port used for further communication between an Audio Gateway (AG) device and a Handsfree (HF) device. For voice audio connections, such as in the Bluetooth HFP, a separate baseband link called a synchronous connection-oriented (SCO) channel carries the voice data, represented as Audio (SCO) 150 in FIG. 1. For A2DP, the audio data (unidirectional high-quality audio content, which may be in mono or stereo) goes over AVDTP 148, which in turn goes over L2CAP 140. At the radio level, all L2CAP 140 data flows over a logical link.

According to various aspects, Bluetooth wireless technology systems generally come in two forms, which include Basic Rate (BR) and Low Energy (LE), wherein the former further includes optional Enhanced Data Rate (EDR) Alternate Media Access Control (MAC) and Physical (PHY) layer extensions. Bluetooth BR systems and Bluetooth LE systems both include device discovery, connection establishment, and connection mechanisms. However, the Bluetooth LE system includes features designed to enable products that require lower current consumption, lower complexity, and lower cost than BR/EDR and has a design to support use cases and applications with lower data rates and lower duty cycles. In general, depending on the use case or application, one system including any optional parts may be more optimal than the other. Furthermore, devices implementing both systems can communicate with other devices implementing both systems as well as devices implementing either system. However, some profiles and use cases may only be supported in one system or the other, whereby devices that implement both systems have the ability to support the most use cases. With reference, to FIG. 1, the Bluetooth core system generally comprises a host and one or more controllers, wherein a host is a logical entity defined as all of the layers below the applications layer 156 in which the Bluetooth profiles are implemented and above the HCI 138, while a controller is a logical entity defined as all of the layers below the HCI 138. According to various aspects, a Bluetooth enabled device generally has one primary controller, which may be a BR/EDR controller that includes the RF layer 132, the baseband layer 134, the link manager protocol layer 136, and optionally the HCI 138. Alternatively, the primary controller may be a Low Energy (LE) controller that includes the LE PHY, link manager protocol layer 136, and optionally the HCI 138. In a further alternative, the primary controller may combine a BR/EDR portion and a LE controller portion into a single controller, in which case the controller configuration has only one Bluetooth device address shared among the combined BR/EDR and LE controller portions.

Figure 2:
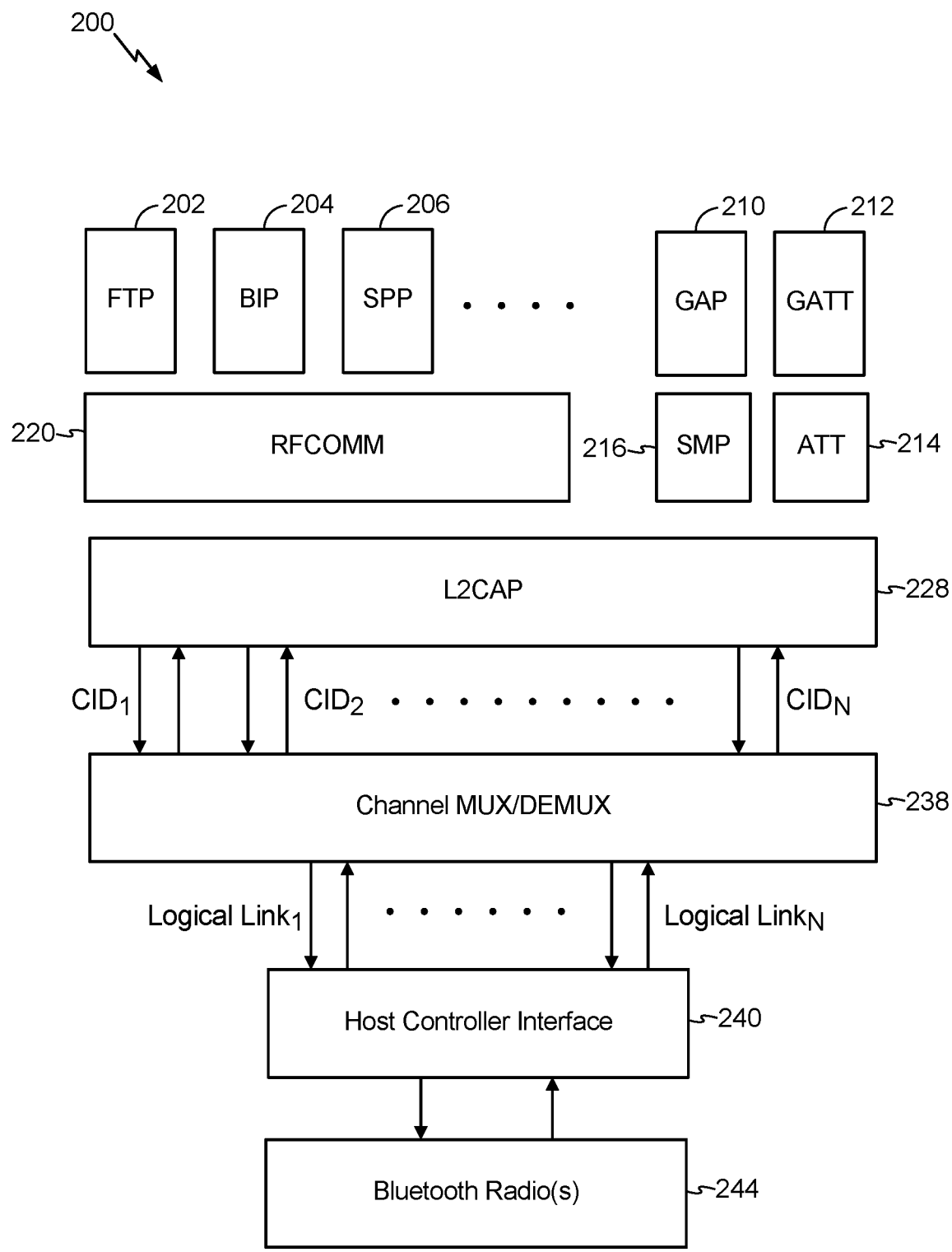
FIG. 2 illustrates an implementation using the Bluetooth protocol stack to support one or more logical connections, according to various aspects.

According to various aspects, FIG. 2 illustrates an implementation using the Bluetooth protocol stack 200 to support one or more logical connections. For example, the File Transfer Protocol (FTP) 202 provides a method to transfer files without the loss of data, which can include all file types including binary and ASCII text, the Basic Imaging Profile (BIP) 204 establishes the fundamental requirements to enable negotiation of the size and encoding of image-related data, the Serial Port Profile (SPP) 206 defines how to set up virtual serial ports and connect two Bluetooth-enabled devices, and the RFCOMM 220 is a protocol based upon the standard for serial port emulation which has been adopted for Bluetooth. Furthermore, as mentioned above, the Bluetooth protocol stack 200 includes an L2CAP layer 228, which provides multiplexing (MUX) and demultiplexing (DEMUX) capabilities in the Bluetooth protocol stack 200. For example, the L2CAP layer 228 may establish a Channel ID (CID) link to a MUX/DEMUX sublayer 238, wherein a CID refers to a logical connection on the L2CAP layer 228 between two devices serving a single application or higher layer protocol. The MUX/DEMUX sublayer 238 may operate over a logical link that the baseband layer protocols provide. The Host Controller Interface (HCI) 240, upon receipt of data over a logical link, communicates the lower layer protocols to the host device (e.g., a Bluetooth-enabled laptop or mobile phone). The HCI 240 therefore represents the command interface to the baseband controller and provides uniform access to the baseband capabilities controlling the Bluetooth radio 244.

According to various aspects, in Bluetooth BR/EDR and Bluetooth LE implementations, the Bluetooth radio 244 operates in the unlicensed 2.4 GHz ISM band. In Bluetooth LE implementations, a frequency hopping transceiver is employed to combat interference and fading and provides many Frequency Hopping Spread Spectrum (FHSS) carriers. In Bluetooth LE, frequency division multiple access (FDMA) and/or time division multiple access (TDMA) schemes may be employed and the physical channel is sub-divided into time units (or "events") in which packets may be positioned to transmit data between Bluetooth LE devices. In general, there are two event types, which include advertising and connection events. Devices that transmit the advertising packets on the advertising PHY channels are referred to as advertisers and devices that receive advertising on the advertising channels without the intention to connect to the advertising device are referred to as scanners. Transmissions on the advertising PHY channels occur in advertising events, wherein at the start of each advertising event, the advertiser sends an advertising packet corresponding to the advertising event type. Depending on the advertising packet type, the scanner may make a request to the advertiser on the same advertising PHY channel and a response from the advertiser on the same advertising PHY channel may follow the request. Above the physical channel, links, channels, and associated control protocols are arranged in a hierarchy based on a physical channel, a physical link, a logical transport, a logical link, and an L2CAP channel.

Referring to FIG. 2, in Bluetooth BR/EDR and Bluetooth LE implementations, the L2CAP layer 228 provides a channel-based abstraction to applications and services, wherein the L2CAP layer 228 fragments and de-fragments application data and multiplexes/de-multiplexes multiple channels over a shared logical link. However, in a Bluetooth LE implementation, two additional protocol layers that reside above the L2CAP layer 228 are provided. In particular, as shown in FIG. 2, the Security Manager protocol (SMP) 216 uses a fixed L2CAP channel to implement security functions between devices and the Attribute protocol (ATT) 214 provides a method to communicate small amounts of data over a fixed L2CAP channel. Devices also use the ATT protocol 214 to determine the services and capabilities associated with other devices. The ATT protocol 214 further depends on the Generic Access Profile (GAP) 210, which provides the basis for all other profiles and defines how two Bluetooth-enabled devices discover and establish a connection with each other. The Generic Attribute (GATT) Profile 212 is built on the ATT protocol 214 and defines a service framework to use the ATT protocol 214 according to procedures, formats, and characteristics associated with certain services (e.g., discovering, reading, writing, notifying, and indicating characteristics, configuring broadcast characteristics, etc.). In general, the GAP 210, the GATT profile 212, and the ATT protocol 214 are not transport-specific and can be used in Bluetooth BR/EDR and Bluetooth LE implementations. However, Bluetooth LE implementations are required to implement the GATT profile 212 and the ATT protocol 214 because the GATT profile 212 is used to discover services in Bluetooth LE.

Figure 3:
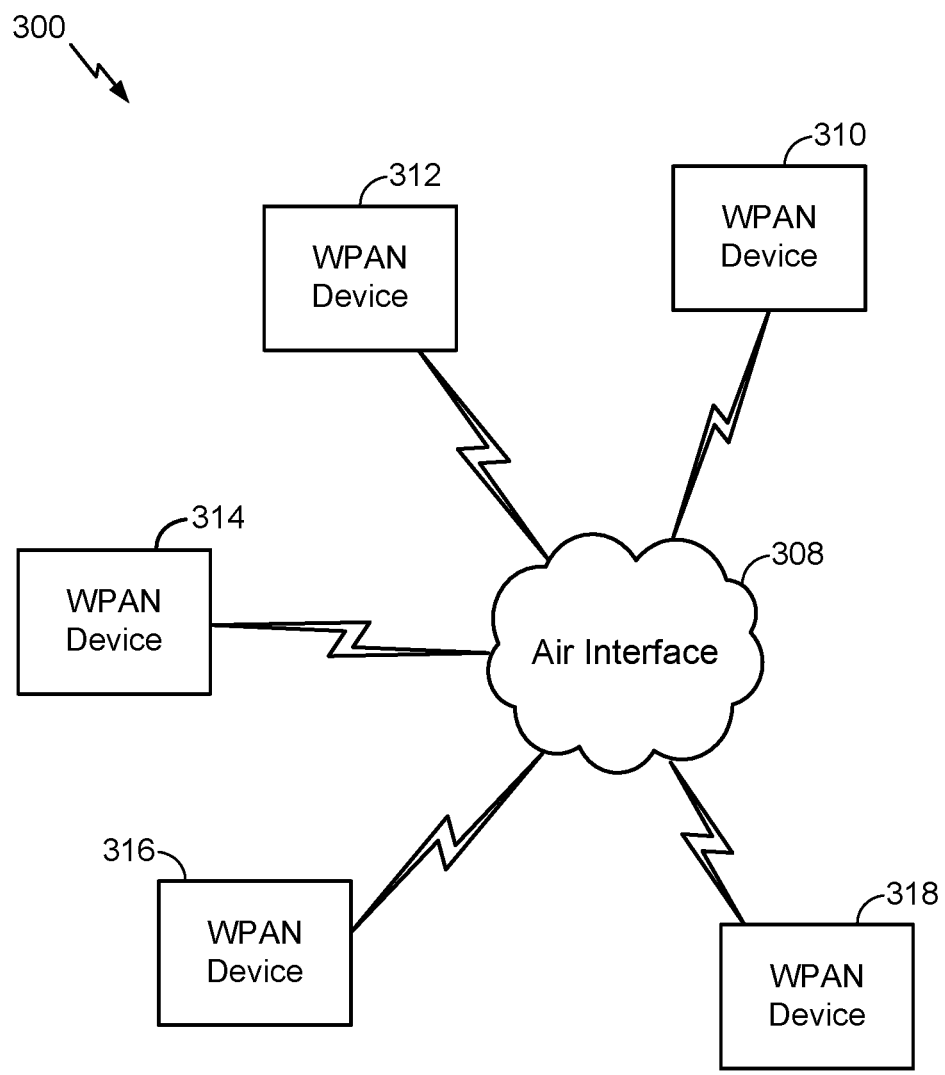
FIG. 3 illustrates an exemplary wireless personal area network (WPAN) in accordance with the various aspects and embodiments described herein.

According to various aspects, FIG. 3 illustrates an exemplary wireless personal area network (WPAN) 300 that includes WPAN devices 310-318 communicating over a physical communications interface or layer, shown in FIG. 3 as air interface 308. In general, those skilled in the art will appreciate that the WPAN devices 310-318 shown in FIG. 3 may be Bluetooth Classic devices and/or Bluetooth LE devices that can implement the Bluetooth protocol stack 130 shown in FIG. 1 and/or the Bluetooth protocol stack 200 shown in FIG. 2 to communicate with one another. However, those skilled in the art will also appreciate that another suitable radio access technology (RAT) may be used to enable communication in the WPAN 300 and/or among the various WPAN devices 310-318 (e.g., ZigBee®, Wireless USB, Z-Wave®, etc.). In general, the WPAN devices 310-318 may communicate point-to-point (unicast) or point-to-multipoint (multicast or broadcast). In either case, performance associated with the wireless communications in the WPAN 300 may be improved through the use of transmit diversity with a beamformer.

Figure 4:
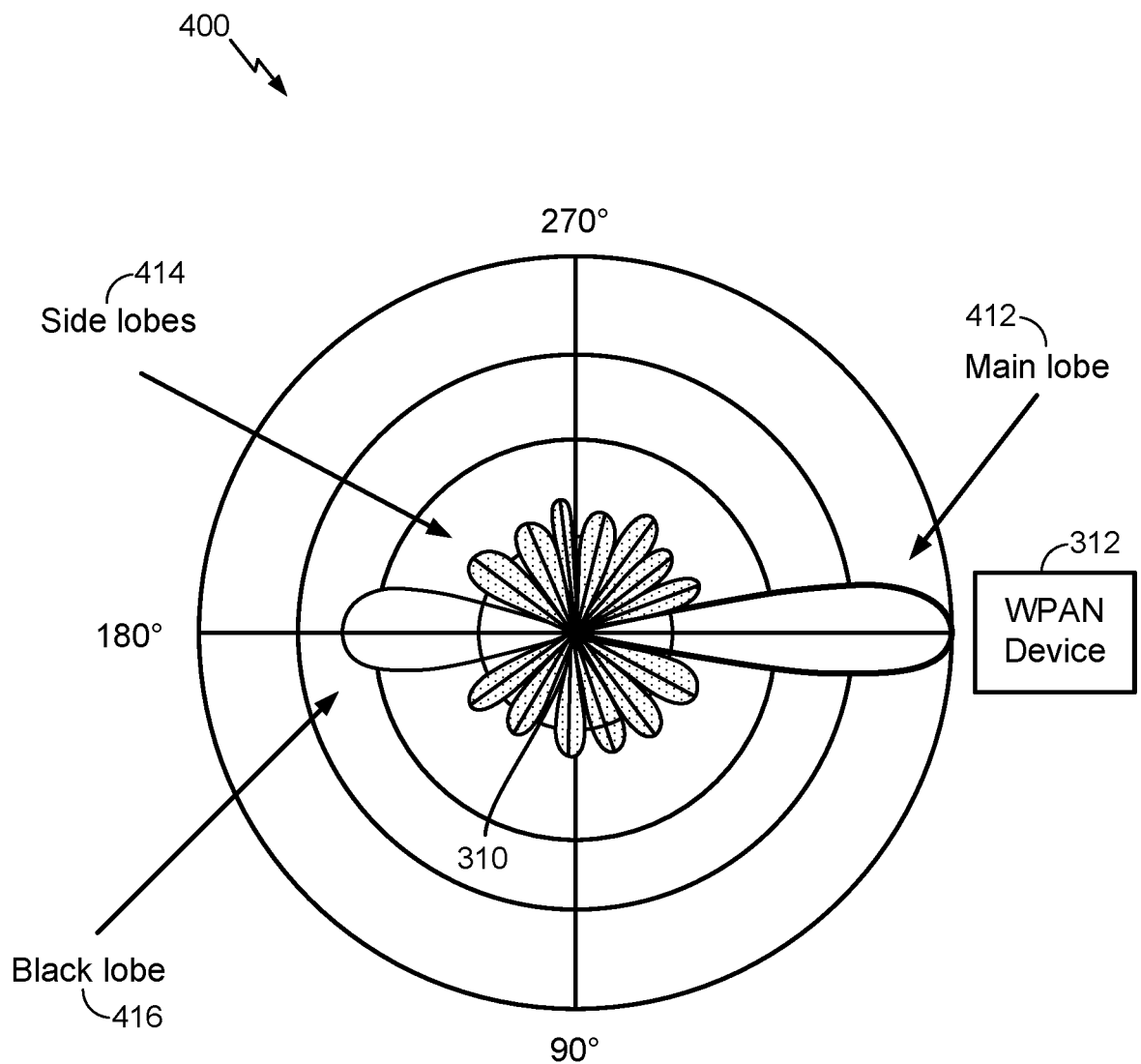
FIG. 4 illustrates an exemplary radiation pattern that may be optimized using transmit beamforming, according to various aspects.

Transmit beamforming generally refers to a technique that may be implemented to improve the range and/or data rate at a given transmitting device that has multiple separate antennas based on the principle that signals sent via the multiple antennas can be manipulate to "steer" a transmitted signal towards a particular recipient. For example, this principle is illustrated in FIG. 4, which shows an exemplary antenna radiation pattern 400 that may be optimized using transmit beamforming. More particularly, the antenna radiation pattern 400 may originate from a transmitting WPAN device 310, depicted in FIG. 4 at the origin of the antenna radiation pattern 400. As shown in FIG. 4, the antenna radiation pattern 400 may have a main lobe 412 that exhibits the greatest field strength, contains the maximum power, and covers the largest area. In general, the direction of the main lobe 412 indicates the directivity of the antenna or the overall antenna radiation pattern 400. Furthermore, as shown in FIG. 4, the antenna radiation pattern 400 includes various side lobes 414, which usually represent unwanted radiation in undesired directions, as well as a back lobe 416 in a direction opposite of the main lobe 412. Accordingly, as specified in the IEEE 802.11n specification, transmit beamforming takes advantage of the multiple transmit antennas that may be available in a multiple input, multiple output (MIMO) system, such as the WPAN devices 310-318, to steer the beam towards an intended receiver based on knowledge of the channel between the transmitter and the receiver.

For example, practical implementations typically involve computing a steering matrix in which transmitter weights are applied to the transmitted signal and used to steer the signal in a direction towards a specific client. The weights, in turn, are derived from Channel State Information (CSI). In general, and as used in the following description, the device that applies the steering matrix to the transmitted signal is called a beamformer (or BFer) and the device towards which the signal is steered is called the beamformee (or BFee). As mentioned earlier, there are generally two ways for the BFer to obtain a channel estimate needed to effectively steer a beam towards the BFee, such as when WPAN device 310 transmits and steers a beam towards WPAN device 312.

The first method involves implicit feedback, wherein a first device transmits a packet (either a regular packet or a sounding packet) to a second device. The second device then estimates the CSI and uses the estimated CSI to steer the beam for the next packet transmitted to the first device. However, the implicit feedback method generally assumes that the channel being estimated is invariant and reciprocal, which therefore limits applications to frequency hopping systems such as Bluetooth Classic and Bluetooth LE. Furthermore, the second method to estimate the CSI involves explicit feedback, where the first device may estimate the CSI from a regular or sounding packet received from the second device. The first device may then send the estimated CSI to the second device, which can use the received CSI to steer the beam for the next packet transmitted to the first device. However, the explicit feedback method also assumes that the channel being estimated is invariant, which similarly limits applications to frequency hopping systems such as Bluetooth Classic and Bluetooth LE.

Figure 5:
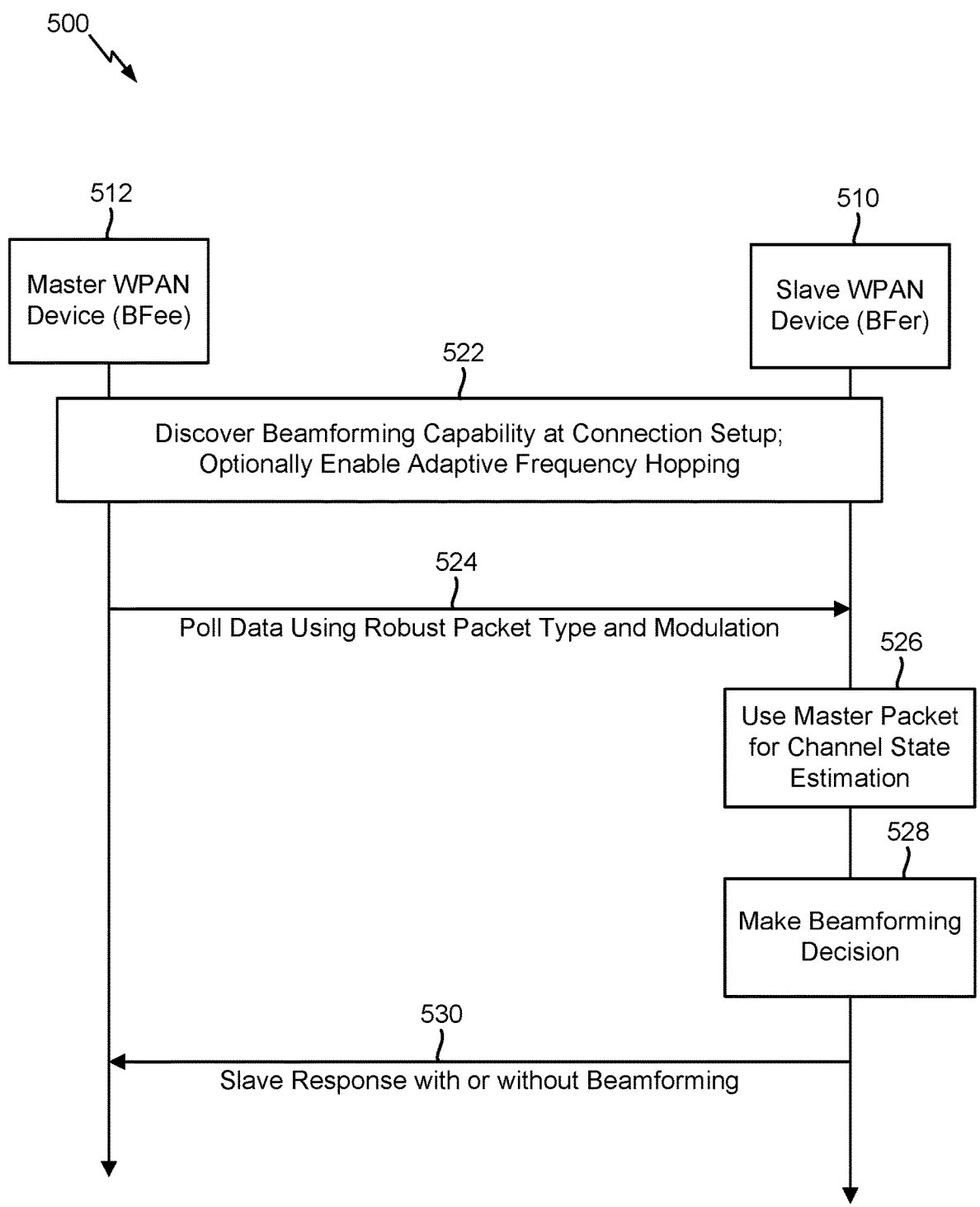
FIG. 5 illustrates an exemplary signaling flow to implicitly enable transmit beamforming at a wireless personal area network (WPAN) slave device communicating with a WPAN master device, according to various aspects.

Nonetheless, there are certain limited circumstances under which a Bluetooth channel may be invariant and reciprocal. More particularly, the Bluetooth channel may generally be invariant when receiving and transmitting on the same frequency, which can be guaranteed during certain Bluetooth events, such as Bluetooth LE connection event and when adaptive frequency hopping (AFH) is enabled in Bluetooth Classic. Accordingly, FIG. 5 illustrates an exemplary signaling flow 500 to implicitly enable transmit beamforming at a slave wireless personal area network (WPAN) device 510 communicating with a master WPAN device 512. In general, the signaling flow 500 may be applied in Bluetooth LE and/or Bluetooth Classic use cases in which the slave WPAN device 510 transmits unicast data or audio to the master WPAN device 512.

In various embodiments, during connection setup at block 522, the master WPAN device 512 and the slave WPAN device 510 may discover beamforming capabilities associated with one another. For example, the basic case to implement transmit beamforming requires two or more antennas at the transmitting device. Furthermore, in a Bluetooth Classic use case, the master WPAN device 512 and the slave WPAN device 510 may enable adaptive frequency hopping (AFH) at block 522.

In various embodiments, assuming that the master WPAN device 512 learns that the slave WPAN device 510 has beamforming capabilities (i.e., can operate as a BFer), the master WPAN device 512 may use a robust packet type and a low throughput modulation to poll data from the slave WPAN device 510, as depicted at 524. For example, in a Bluetooth LE use case, the master WPAN device 512 may transmit the packet used to poll the data from the slave WPAN device 510 at each connection event. Alternatively, in a Bluetooth Classic use case, the master WPAN device 512 may transmit the packet used to poll the data from the slave WPAN device 510 at each Bluetooth frame in which the master WPAN device 512 transmits. In either case, the slave WPAN device 510 may use the polling packet received from the master WPAN device 512 to estimate the CSI at block 526. The slave WPAN device 510 may then make a beamforming decision at block 528 and transmit an appropriate response to the master WPAN device 512 with or without beamforming, as depicted at 530. For example, in various embodiments, the slave WPAN device 510 may make the beamforming decision based on a received signal strength indication (RSSI) associated with the polling packet, channel assessment information, a retransmission and/or lost packet rate, a quality of service (QoS) requirement for the link, and/or other suitable criteria. Furthermore, although not explicitly shown in FIG. 5, the slave WPAN device 510 combines the beamforming decision at block 528 with a transmit power control decision made each time that the slave WPAN device 510 transmits to the master WPAN device 512. Accordingly, because the polling packet received at 524 is received on the same frequency used to transmit the slave response at 530, the Bluetooth channel may be guaranteed to be invariant during that time. As such, the slave WPAN device 510 can estimate the CSI from the polling packet received at 524 and beamform the response packet transmitted to the master WPAN device 512 at 530.

According to various aspects, as discussed above, the signaling flow 500 shown in FIG. 5 may enable a slave WPAN device 510 to operate as a beamformer (BFer) during connection events in a Bluetooth LE use case and/or when AFH is enabled in a Bluetooth Classic use case. However, because Bluetooth Classic and Bluetooth LE use cases are typically implemented such that the master is the first entity to transmit during each connection event and subsequent transmissions are on a different frequency due to the frequency hopping scheme, the signaling flow 500 shown in FIG. 5 can only be used to provide the slave WPAN device 510 with a recent enough CSI to enable beam steering.

Figure 6A:
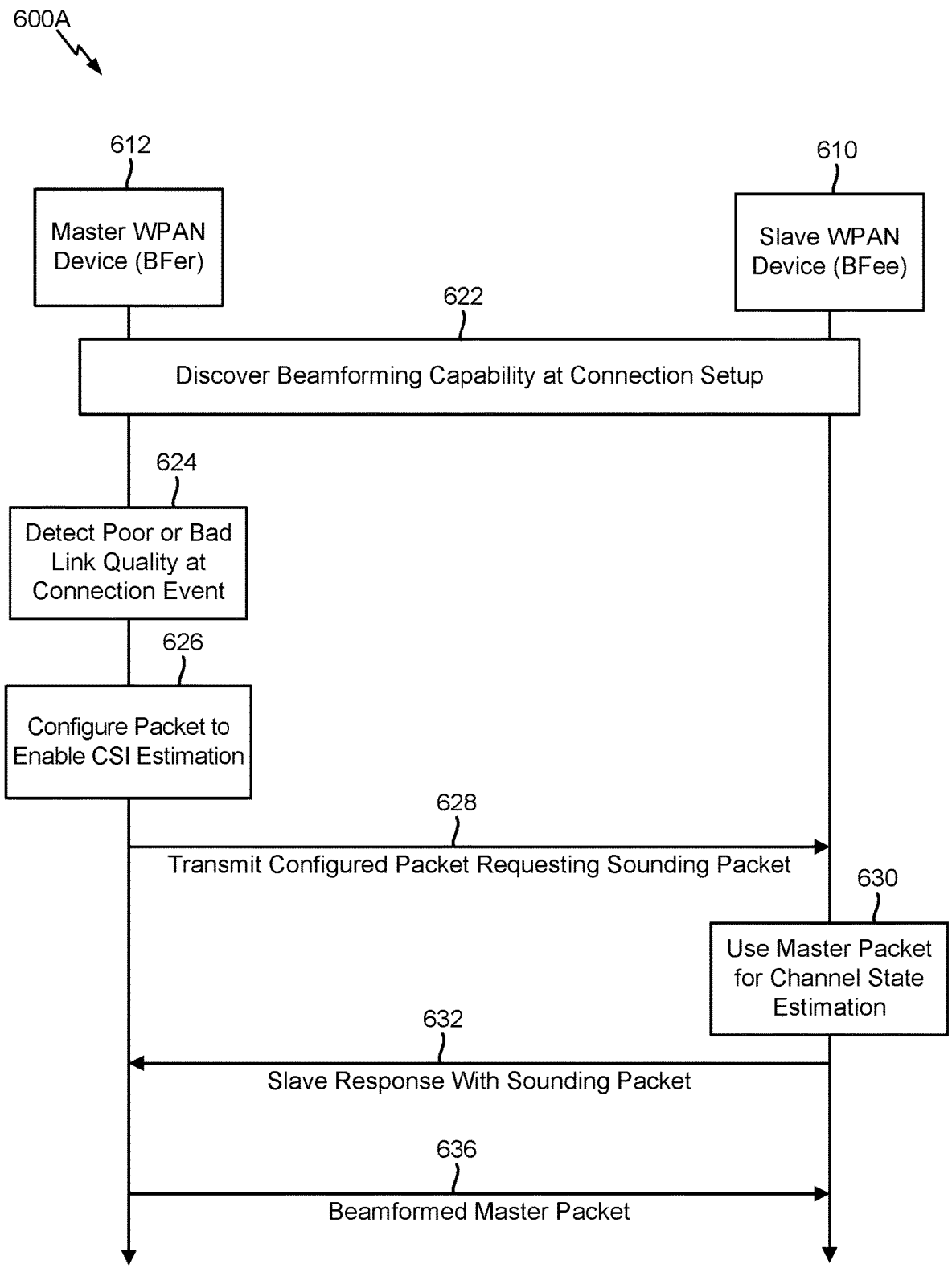
FIG. 6A and FIG. 6B illustrate exemplary signaling flows to implicitly and/or explicitly enable transmit beamforming at a wireless personal area network (WPAN) master device communicating with a WPAN slave device, according to various aspects.
Figure 6B:
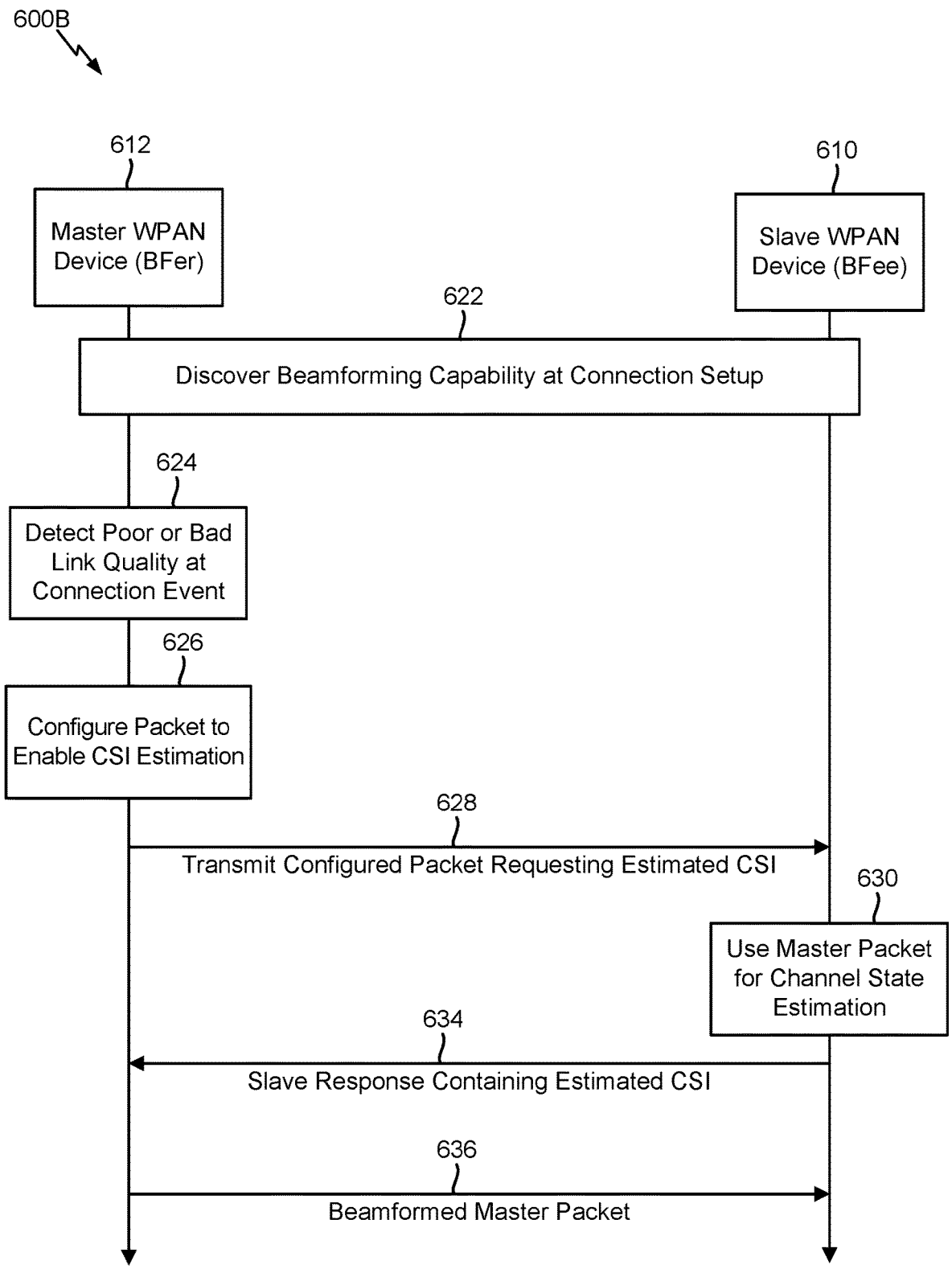

Accordingly, FIG. 6A and FIG. 6B illustrate exemplary signaling flows 600A, 600B that can be used to implicitly and/or explicitly enable transmit beamforming at a master WPAN device 612 such that the master WPAN device 612 may operate as the beamformer (BFer) and a slave WPAN device 610 may operate as a beamformee (BFee). Furthermore, those skilled in the art will appreciate that transmit beamforming is generally implemented per-packet at a baseband level, whereby the signaling flow 500 shown in FIG. 5 and the signaling flows 600A, 600B shown in FIG. 6A and FIG. 6B may be used in combination to enable bidirectional beamformed communications in a WPAN. Furthermore, as will be described in further detail herein, the signaling flows 600A, 600B as shown in FIG. 6A and FIG. 6B may support certain aspects in which sounding packets are used to enable the master WPAN device 612 to beamform packets transmitted to the slave WPAN device 610. As such, the signaling flows 600A, 600B as shown in FIG. 6A and FIG. 6B may be at least partially implemented on top of a Bluetooth use case, as current Bluetooth implementations do not support sounding packets for the purpose of estimating general channel state information (CSI) and/or explicit transmit beamforming procedure(s).

According to various aspects, during connection setup at block 622, the master WPAN device 612 and the slave WPAN device 610 may discover beamforming capabilities associated with one another in a similar manner as described above. In various embodiments, the master WPAN device 612 may determine a quality of the link with the slave WPAN device 610 at each connection event (e.g., based on a received signal strength indication (RSSI) associated with packets received from the slave WPAN device 610, channel assessment information, a retransmission and/or lost packet rate, a QoS requirement for the link, and/or other suitable criteria). When conditions on the link between the master WPAN device 612 and the slave WPAN device 610 are normal, the master WPAN device 612 may simply transmit to the slave WPAN device 610 using regular data packets and modulation and the slave WPAN device 610 may respond in the normal manner, with or without beamforming (e.g., based on the signaling flow 500 as shown in FIG. 5).

However, when the master WPAN device 612 detects a poor link quality or a bad link quality at block 624, the master WPAN device 612 may take action to initiate a procedure to implicitly enable beamforming with respect to transmissions to the slave WPAN device 610, as shown in FIG. 6A, as described herein.

In particular, the master WPAN device 612 may configure a packet to enable the slave WPAN device 610 to estimate the CSI at block 626. For example, in various embodiments, the configured packet may be a regular Bluetooth LE packet type that is transmitted with a low bit rate modulation when the link quality is poor. The master WPAN device 612 may therefore transmit the Bluetooth LE packet type with the low bit rate modulation to the slave WPAN device 610, as depicted at 628. This packet may contain information to request the slave WPAN device 610 to respond with a sounding packet. At block 630, the slave WPAN device 610 may then use the packet that was transmitted at 628 to estimate the CSI between the master WPAN device 612 and the slave WPAN device 610. The slave WPAN device 610 may then transmit a sounding packet to the master WPAN device 612, as depicted at 632 (e.g., a special packet that helps with CSI estimation). As such, in various embodiments, the master WPAN device 612 can then estimate the CSI based on the sounding packet and appropriately beamform subsequent packets that are transmitted to the slave WPAN device 610 based on the estimated CSI, as depicted at 636. For example, in various embodiments, the beamformed packet transmitted to the slave WPAN device 610 at 636 may be the first packet in a connection event sequence, and the slave WPAN device 610 can then make a decision about whether to beamform a response to the packet that was transmitted at 636 in the same manner as described above with respect to FIG. 5. Furthermore, as described above, the master WPAN device 612 and the slave WPAN device 610 can both combine their respective beamforming decision(s) with a transmit power control decision made each time that a transmission is sent to the other device.

According to various aspects, returning to block 626, the configured packet may be a specific sounding packet, which may be a null data packet (NDP), a packet containing a robust and easily acquired synchronization word, or another suitably configured packet that allows the slave WPAN device 610 to estimate the CSI of the transmission from the master WPAN device 612 to the slave WPAN device 610.

According to various aspects, the signaling flow 500 shown in FIG. 5 and the signaling 600A shown in FIG. 6A have been described above in relation to approaches to implicitly enable transmit (Tx) beamforming in a WPAN. More particularly, implicit transmit beamforming (with or without sounding packets) may generally refer to implementations in which the beamformer or "BFer" (e.g., the slave WPAN device 510 in FIG. 5, the master WPAN device 612 in FIG. 6A) estimates the CSI and assumes that the channel is reciprocal such that the BFer can use the locally computed CSI estimate to appropriately form and steer the beam towards the beamformee or "BFee." In the implicit transmit beamforming approach(es), the BFee generally does not send any estimated CSI to the BFer. However, the signaling flow 600A as shown FIG. 6A can be adapted to explicitly enable transmit beamforming for the transmissions sent between the master WPAN device 612 and the slave WPAN device 610, as shown in FIG. 6B.

In particular, the explicit transmit beamforming approach shown in FIG. 6B may be implemented with or without sounding packets, wherein the BFee may estimate the CSI and send the estimated CSI to the BFer, which then uses the estimated CSI received from the BFee to form the beam. For example, when the master WPAN device 612 detects poor link quality, the packet that is configured at block 626 and transmitted to the slave WPAN device 610 at 628 may comprise a regular protocol data unit (PDU) that also includes an explicit request for the slave WPAN device 610 to return the CSI that is estimated at block 630. Accordingly, as depicted at 634, the slave response includes the estimated CSI such that the master packet transmitted at 636 is an explicit beamformed packet based on the estimated CSI received from the slave WPAN device 610. Following packets may then use low or high bit modulation, use beamforming, and include CSI to enable beamforming for the subsequent packets. Furthermore, when the master WPAN device 612 detects bad link quality, the slave response as transmitted at 634 may be an implicit beamformed packet (i.e., based on the CSI that the slave WPAN device 610 estimates at block 630). The following packets may then continue in substantially the same manner as described above with respect to the poor link case.

Figure 7:
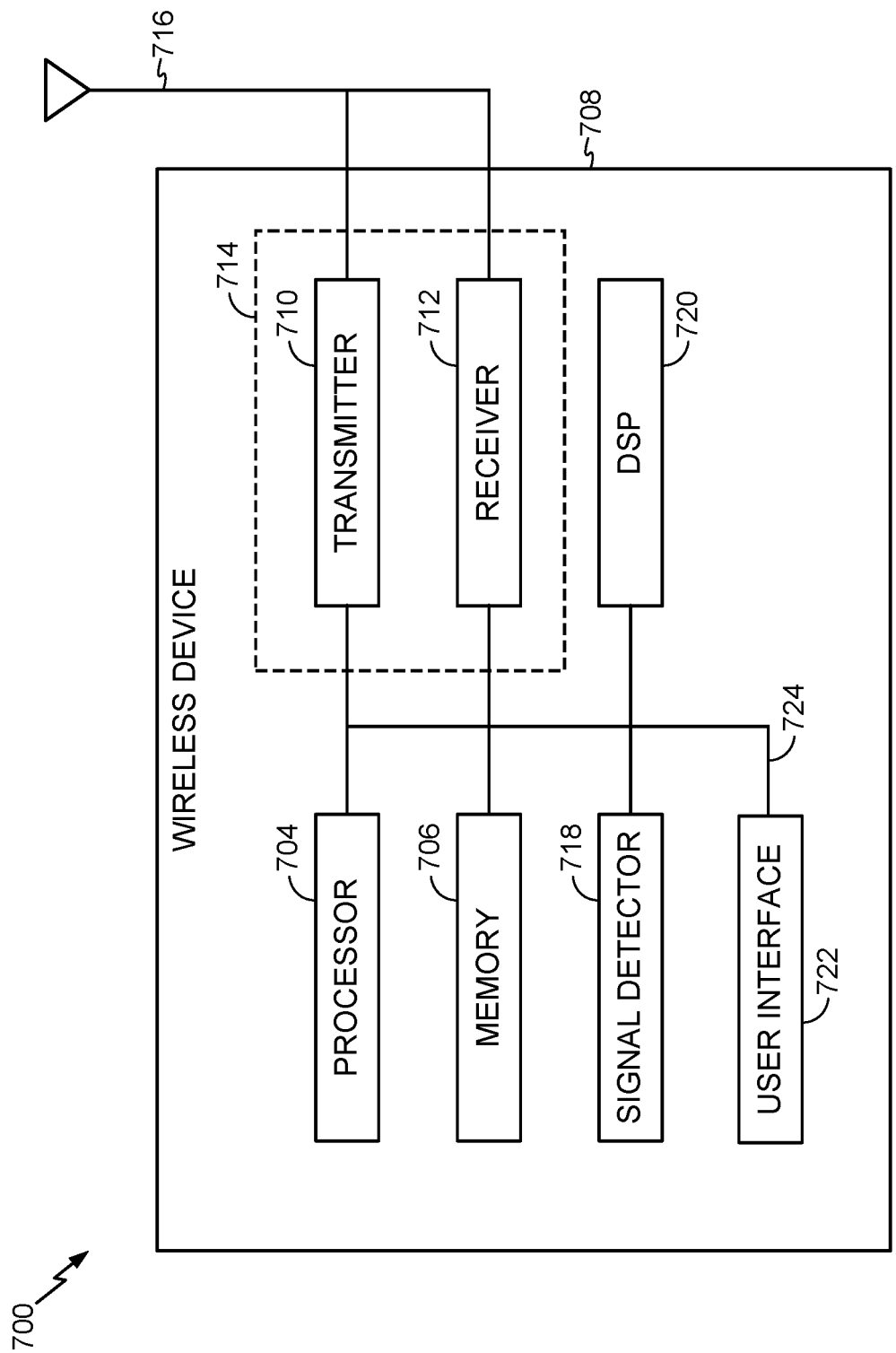
FIG. 7 illustrates an exemplary wireless device that can implement the various aspects and embodiments described herein.

According to various aspects, FIG. 7 illustrates an exemplary wireless device 700 that can implement the various aspects and embodiments described herein. For example, in various embodiments, the wireless device 700 shown in FIG. 7 may correspond to a master device and/or a slave device that can transmit a beamformed packet in accordance with the various aspects and embodiments described herein.

In various embodiments, the wireless device 700 may include a processor 704, a memory 706, a housing 708, a transmitter 710, a receiver 712, one or more antenna 716, a signal detector 718, a digital signal processor (DSP) 720, a user interface 722, and a bus 724. Alternatively, the functions associated with the transmitter 710 and the receiver 712 can be incorporated into a transceiver 714. The wireless device 700 can be configured to communicate in a wireless network that includes, for example, a base station, an access point, and the like.

In various embodiments, the processor 704 can be configured to control operations associated with the wireless device 700, wherein the processor 704 may also be referred to as a central processing unit (CPU). The memory 706 can be coupled to the processor 704, can be in communication with the processor 704, and can provide instructions and data to the processor 704. The processor 704 can perform logical and arithmetic operations based on program instructions stored within the memory 706. The instructions in the memory 706 can be executable to perform one or more methods and processes described herein. Furthermore, in various embodiments, the processor 704 can include, or be a component in, a processing system implemented with one or more processors. The one or more processors can be implemented with any one or more general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, combinations thereof, and/or any other suitable entities that can perform calculations and/or manipulate information. In various embodiments, the processing system can also include machine-readable media configured to store software, which can be broadly construed to include any suitable instructions, whether referred to as software, firmware, middleware, microcode, hardware description language, or otherwise. Instructions can include code in a source code format, a binary code format, an executable code format, and/or any other suitable format. The instructions, when executed on the one or more processors, can cause the processing system to perform one or more of the functions described herein.

In various embodiments, the memory 706 can include read-only memory (ROM), random access memory (RAM), and/or any suitable combination thereof. The memory 706 can also include non-volatile random access memory (NVRAM).

In various embodiments, the transmitter 710 and the receiver 712 (or the transceiver 714) can transmit and receive data between the wireless device 700 and a remote location. The antenna 716 can be attached to the housing 708 and electrically coupled to the transceiver 714. In some implementations, the wireless device 700 can also include multiple transmitters, multiple receivers, multiple transceivers, and/or multiple antennas (not illustrated). In various embodiments, the signal detector 718 can be used to detect and quantify the level associated with one or more signals received at the transceiver 714. The signal detector 718 can detect such signals as total energy, energy per subcarrier per symbol, power spectral density, and/or and in other ways. In various embodiments, the DSP 720 can be used to process signals, wherein the DSP 720 can be configured to generate a packet to be transmitted via the transmitter 710 and/or the transceiver 714. In various embodiments, the packet can include a physical layer protocol data unit (PPDU).

In various embodiments, the user interface 722 can include, for example, a keypad, a microphone, a speaker, a display, and/or other suitable interfaces. The user interface 722 can include any element or component that conveys information to a user associated with the wireless device 700 and/or receives input from the user.

In various embodiments, the various components associated with the wireless device 700 can be coupled together via a bus 724, which may include a data bus and a power bus, a control signal bus, and/or a status signal bus in addition to the data bus.

In various embodiments, the wireless device 700 can also include other components or elements not illustrated in FIG. 7. One or more components associated with the wireless device 700 can be in communication with another one or more components associated with the wireless device 700 via means that may comprise another communication channel (not illustrated) to provide, for example, an input signal to the other component.

In various embodiments, although various separate components are illustrated in FIG. 7, one or more components shown therein can be combined or commonly implemented. For example, the processor 704 and the memory 706 can be embodied on a single chip. The processor 704 can additionally, or in the alternative, contain memory, such as processor registers. Similarly, one or more functional blocks or portions thereof can be embodied on a single chip. Alternatively, the functionality associated with a particular block can be implemented on two or more chips. For example, the processor 704 can be used to implement not only the functionality described above with respect to the processor 704, but also to implement the functionality described above with respect to the signal detector 718 and/or the DSP 720.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, etc.).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for beamforming wireless transmissions, comprising:
    establishing, at a beamformer device, a Bluetooth wireless link with a beamformee device in a Bluetooth wireless network that implements a frequency hopping system;
    transmitting a first beamforming capability packet from the beamformer device to the beamformee device during a connection setup of the Bluetooth wireless link, the first beamforming capability packet configured to indicate beamforming capabilities of the beamformer device;
    receiving a second beamforming capability packet from the beamformee device in response to the first beamforming capability packet, the second beamforming capability packet configured to indicate beamforming capabilities of the beamformee device;
    receiving, at the beamformer device, a first packet from the beamformee device, wherein the first packet is received on a first frequency;
    estimating, at the beamformer device, channel state information associated with the Bluetooth wireless link based on the first packet received from the beamformee device; and
    beamforming, by the beamformer device, a second packet transmitted to the beamformee device to steer the second packet in a direction towards the beamformee device, wherein the second packet is transmitted on the first frequency.

2. The method recited in claim 1, further comprising deciding, at the beamformer device, whether to beamform the second packet based on one or more of channel assessment information, a received signal strength indication (RSSI) associated with the first packet, a retransmission or lost packet rate, or a quality of service (QoS) requirement for the Bluetooth wireless link.

3. The method recited in claim 2, wherein the beamformer device decides whether to beamform the second packet in combination with a transmit power control decision for the second packet.

4. The method recited in claim 1, wherein the first packet is received and the second packet is transmitted during a Bluetooth connection event.

5. The method recited in claim 1, wherein the first packet is received in a Bluetooth frame allocated to a transmission from the beamformee device while adaptive frequency hopping is enabled for the Bluetooth wireless link.

6. The method recited in claim 1, wherein the first packet received from the beamformee device has a predetermined packet type and modulation to poll data from the beamformer device.

7. The method recited in claim 1, further comprising discovering, at the beamformer device, beamforming capabilities associated with the beamformee device during a connection setup procedure.

8. The method recited in claim 1, wherein the Bluetooth wireless link is established to implement a Bluetooth use case in which the beamformer device transmits unicast data or audio to the beamformee device.

9. The method recited in claim 1, wherein the beamformer device and the beamformee device implement a Bluetooth use case in which the beamformer device acts in a slave role and the beamformee device acts in a master role.

10. A beamformer device, comprising:
a receiver configured to receive, from a beamformee device, a first packet transmitted on a first frequency over a Bluetooth wireless network that implements a frequency hopping system; wherein the receiver is configured to receive, from the beamformee device, a second beamforming capability packet, the second beamforming capability packet configured to indicate beamforming capabilities of the beamformee device;
one or more processors configured to estimate channel state information associated with a Bluetooth wireless link between the beamformer device and the beamformee device based on the first packet received from the beamformee device; and
a transmitter configured to transmit a first beamforming capability packet from the beamformer device to the beamformee device during a connection setup of the Bluetooth wireless link in response to the second beamforming capability packet, the first beamforming capability packet configured to indicate beamforming capabilities of the beamformer device; the transmitter comprising multiple transmit antennas configured to beamform a second packet transmitted to the beamformee device such that the second packet is steered in a direction towards the beamformee device, wherein the second packet is transmitted on the first frequency.

11. The beamformer device recited in claim 10, wherein the one or more processors are further configured to decide whether to beamform the second packet based on one or more of channel assessment information, a received signal strength indication (RSSI) associated with the first packet, a retransmission or lost packet rate, or a quality of service (QoS) requirement for the Bluetooth wireless link.

12. The beamformer device recited in claim 11, wherein the one or more processors are configured to decide whether to beamform the second packet in combination with a transmit power control decision for the second packet.

13. The beamformer device recited in claim 10, wherein the first packet is received and the second packet is transmitted during a Bluetooth connection event.

14. The beamformer device recited in claim 10, wherein the first packet is received in a Bluetooth frame allocated to a transmission from the beamformee device while adaptive frequency hopping is enabled for the Bluetooth wireless link.

15. The beamformer device recited in claim 10, wherein the first packet received from the beamformee device has a predetermined packet type and modulation to poll data from the beamformer device.

16. The beamformer device recited in claim 10, wherein the one or more processors are further configured to discover beamforming capabilities associated with the beamformee device during a connection setup procedure.

17. The beamformer device recited in claim 10, wherein the Bluetooth wireless link is established to implement a Bluetooth use case in which the beamformer device is configured to transmit unicast data or audio to the beamformee device.

18. The beamformer device recited in claim 10, wherein the beamformer device and the beamformee device implement a Bluetooth use case in which the beamformer device is configured to act in a slave role and the beamformee device is configured to act in a master role.

19. A beamformer device, comprising:
means for receiving, from a beamformee device, a first packet transmitted on a first frequency over a Bluetooth wireless network that implements a frequency hopping system; wherein the means for receiving is configured to receive, from the beamformee device, a second beamforming capability packet, the second beamforming capability packet configured to indicate beamforming capabilities of the beamformee device;
means for estimating channel state information associated with a Bluetooth wireless link between the beamformer device and the beamformee device based on the first packet received from the beamformee device; and
means for beamforming configured to transmit a first beamforming capability packet from the beamformer device to the beamformee device during a connection setup of the Bluetooth wireless link in response to the second beamforming capability packet, the first beamforming capability packet configured to indicate beamforming capabilities of the beamformer device; the means for beamforming configured to transmit a second packet to the beamformee device such that the second packet is steered in a direction towards the beamformee device, wherein the second packet is transmitted on the first frequency.

20. A computer-readable storage medium having computer-executable instructions recorded thereon, the computer-executable instructions configured to cause a beamformer device having one or more processors to:
receive, from a beamformee device, a first packet transmitted on a first frequency over a Bluetooth wireless network that implements a frequency hopping system;
transmit a first beamforming capability packet from a beamformer device to the beamformee device during a connection setup, the first beamforming capability packet configured to indicate beamforming capabilities of the beamformer device;
receive a second beamforming capability packet from the beamformee device to the beamformer device in response to the first beamforming capability packet, the second beamforming capability packet configured to indicate beamforming capabilities of the beamformee device;

estimate channel state information associated with a Bluetooth wireless link between the beamformer device and the beamformee device based on the first packet received from the beamformee device; and beamform a second packet transmitted to the beamformee device such that the second packet is steered in a direction towards the beamformee device, wherein the second packet is transmitted on the first frequency.

21. A method for beamforming wireless transmissions, comprising:
    establishing, at a beamformer device, a Bluetooth wireless link with a beamformee device in a Bluetooth wireless network that implements a frequency hopping system;
    transmitting a first beamforming capability packet from the beamformer device to the beamformee device during a connection setup of the Bluetooth wireless link, the first beamforming capability packet configured to indicate beamforming capabilities of the beamformer device;
    receiving a second beamforming capability packet from the beamformee device in response to the first beamforming capability packet, the second beamforming capability packet configured to indicate beamforming capabilities of the beamformee device;
    configuring, at the beamformer device, a first packet to request that the beamformee device return a response packet that enables the beamformer device to obtain an estimate of channel state information associated with the Bluetooth wireless link;
    transmitting, by the beamformer device, the first packet to the beamformee device; and
    beamforming, by the beamformer device, a second packet transmitted to the beamformee device in accordance with the frequency hopping system based on the response packet returned from the beamformee device, wherein the beamformer device is configured to beamform the second packet to steer the second packet in a direction towards the beamformee device.

22. The method recited in claim 21, wherein the first packet is configured to request that the beamformee device return a sounding packet as the response packet.

23. The method recited in claim 22, further comprising:
    receiving the sounding packet from the beamformee device; and
    estimating, at the beamformer device, the channel state information based on the sounding packet received from the beamformee device.

24. The method recited in claim 21, wherein the first packet is configured to request that the beamformee device estimate the channel state information and return the estimated channel state information to the beamformer device.

25. The method recited in claim 24, further comprising:
    receiving the response packet from the beamformee device, wherein the response packet includes the channel state information estimated at the beamformee device; and
    using, at the beamformer device, the channel state information estimated at the beamformee device to beamform the second packet transmitted to the beamformee device.

26. The method recited in claim 21, wherein the beamformer device configures the first packet to request that the beamformee device return the response packet that enables the beamformer device to obtain the estimated channel state information in response to the Bluetooth wireless link having a poor quality or a bad quality.

27. The method recited in claim 21, further comprising deciding, at the beamformer device, whether to beamform the second packet based on one or more of channel assessment information, a received signal strength indication (RSSI) associated with the response packet, a retransmission or lost packet rate, or a quality of service (QoS) requirement for the Bluetooth wireless link.

28. The method recited in claim 27, wherein the beamformer device decides whether to beamform the second packet in combination with a transmit power control decision for the second packet.

29. The method recited in claim 21, wherein the first packet is configured as a Bluetooth packet type.

30. The method recited in claim 21, wherein the response packet is an implicit beamformed packet containing the estimated channel state information.

31. The method recited in claim 21, wherein the beamformer device and the beamformee device implement a Bluetooth use case in which the beamformer device acts in a master role and the beamformee device acts in a slave role.

32. A beamformer device, comprising:
    one or more processors configured to establish a Bluetooth wireless link with a beamformee device in a Bluetooth wireless network that implements a frequency hopping system and to configure a first packet to request that the beamformee device return a response packet to enable the beamformer device to obtain an estimate of channel state information associated with the Bluetooth wireless link;
    a receiver configured to receive a second beamforming capability packet from the beamformee device, the second beamforming capability packet configured to indicate beamforming capabilities of the beamformee device; and
    a transmitter configured to transmit a first beamforming capability packet from the beamformer device to the beamformee device during a connection setup of the Bluetooth wireless link, the first beamforming capability packet configured to indicate beamforming capabilities of the beamformer device; wherein the transmitter is configured to transmit the first packet to the beamformee device and to transmit a second packet to the beamformee device in accordance with the frequency hopping system based on the response packet returned from the beamformee device, wherein the transmitter comprises multiple transmit antennas configured to beamform at least the second packet such that the second packet is steered in a direction towards the beamformee device.

33. The beamformer device recited in claim 32, wherein the first packet is configured to request that the beamformee device return a sounding packet as the response packet.

34. The beamformer device recited in claim 33, further comprising:
    a receiver configured to receive the sounding packet from the beamformee device, wherein the one or more processors are further configured to estimate the channel state information based on the sounding packet received from the beamformee device.

35. The beamformer device recited in claim 32, wherein the first packet is configured to request that the beamformee device estimate the channel state information and return the estimated channel state information to the beamformer device.

36. The beamformer device recited in claim 35, further comprising:

a receiver configured to receive the response packet from the beamformee device, the response packet including the channel state information estimated at the beamformee device, wherein the transmitter is further configured to use the channel state information estimated at the beamformee device to beamform the second packet transmitted to the beamformee device.

37. The beamformer device recited in claim 32, wherein the first packet is configured to request that the beamformee device return the response packet to enable the beamformer device to obtain the estimated channel state information in response to the Bluetooth wireless link having a poor quality or a bad quality.

38. The beamformer device recited in claim 32, wherein the one or more processors are further configured to decide whether to beamform the second packet based on one or more of channel assessment information, a received signal strength indication (RSSI) associated with the response packet, a retransmission or lost packet rate, or a quality of service (QoS) requirement for the Bluetooth wireless link.

39. The beamformer device recited in claim 38, wherein the one or more processors are configured to decide whether to beamform the second packet in combination with a transmit power control decision for the second packet.

40. The beamformer device recited in claim 32, wherein the first packet is configured as a Bluetooth packet type.

41. The beamformer device recited in claim 32, wherein the response packet is an implicit beamformed packet containing the estimated channel state information.

42. The beamformer device recited in claim 32, wherein the beamformer device and the beamformee device implement a Bluetooth use case in which the beamformer device is configured to act in a master role and the beamformee device is configured to act in a slave role.

43. A beamformer device, comprising:
    means for establishing a Bluetooth wireless link with a beamformee device in a Bluetooth wireless network that implements a frequency hopping system;
    means for transmitting a first beamforming capability packet from the beamformer device to the beamformee device during a connection setup of the Bluetooth wireless link, the first beamforming capability packet configured to indicate beamforming capabilities of the beamformer device;
    means for receiving a second beamforming capability packet from the beamformee device in response to the first beamforming capability packet, the second beamforming capability packet configured to indicate beamforming capabilities of the beamformee device;
    means for configuring a first packet to request that the beamformee device return a response packet to enable the beamformer device to obtain an estimate of channel state information associated with the Bluetooth wireless link;
    means for transmitting the first packet to the beamformee device; and
    means for transmitting a second packet to the beamformee device in accordance with the frequency hopping system based on the response packet returned from the beamformee device, wherein at least the second packet is beamformed such that the second packet is steered in a direction towards the beamformee device.

44. A computer-readable storage medium having computer-executable instructions recorded thereon, the computer-executable instructions configured to cause a beamformer device having one or more processors to:
    establish a Bluetooth wireless link with a beamformee device in a Bluetooth wireless network that implements a frequency hopping system;
    transmit a first beamforming capability packet from the beamformer device to the beamformee device during a connection setup of the Bluetooth wireless link, the first beamforming capability packet configured to indicate beamforming capabilities of the beamformer device;
    receive a second beamforming capability packet from the beamformee device in response to the first beamforming capability packet, the second beamforming capability packet configured to indicate beamforming capabilities of the beamformee device;
    configure a first packet to request that the beamformee device return a response packet to enable the beamformer device to obtain an estimate of channel state information associated with the Bluetooth wireless link;
    transmit the first packet to the beamformee device; and
    transmit a second packet to the beamformee device in accordance with the frequency hopping system based on the response packet returned from the beamformee device, wherein at least the second packet is beamformed such that the second packet is steered in a direction towards the beamformee device.

* * * * *